Feb. 3, 1925.  
W. E. WILLIAMS  
1,525,112  
DEMOUNTABLE RIM AND DISK FASTENING FOR AUTOMOBILE WHEELS  
Filed Jan. 3, 1923
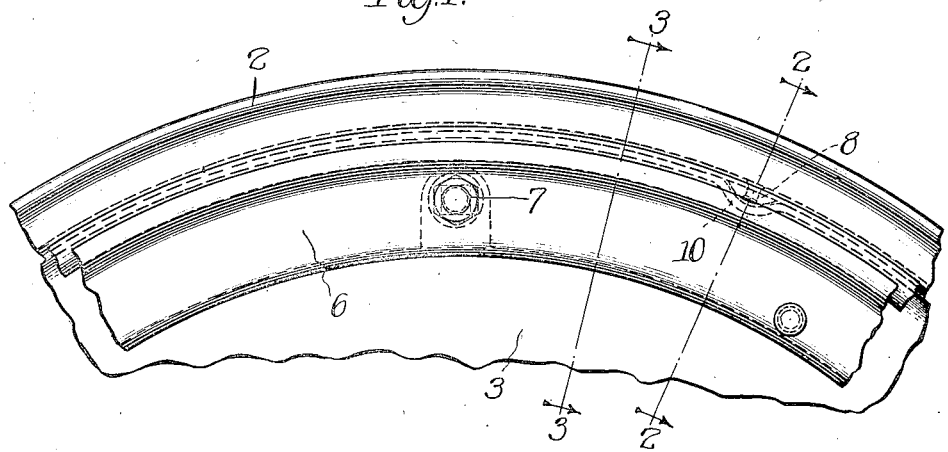
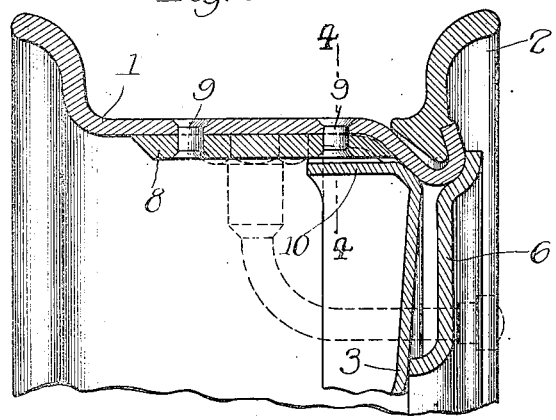
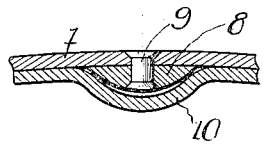
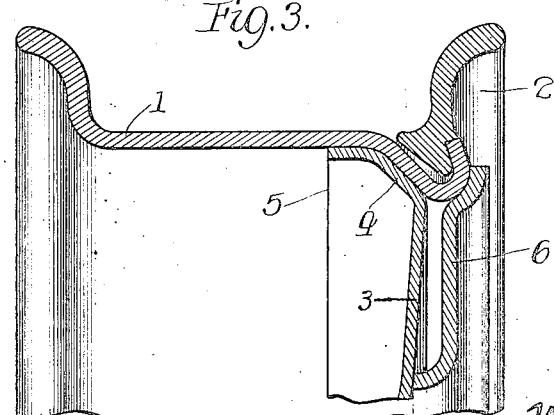

Patented Feb. 3, 1925.

1,525,112

UNITED STATES PATENT OFFICE.

WILLIAM ERASTUS WILLIAMS, OF WILMETTE, ILLINOIS, ASSIGNOR TO AMERICAN STEEL FOUNDRIES, OF CHICAGO, ILLINOIS, A CORPORATION OF NEW JERSEY.

DEMOUNTABLE RIM AND DISK FASTENING FOR AUTOMOBILE WHEELS.

Application filed January 3, 1923. Serial No. 610,428.

*To all whom it may concern:*

Be it known that I, WILLIAM ERASTUS WILLIAMS, a citizen of the United States, and a resident of Wilmette, in the county of Cook and State of Illinois, have invented a new and useful Improvement in Demountable Rim and Disk Fastenings for Automobile Wheels, of which the following is a specification.

The object of my invention is to provide a suitable driving lug for a demountable rim mounted on a disk wheel that will in no manner weaken the disk itself and yet be of simple construction and hardy in service.

Reference will be had to the accompanying drawing in which—

Figure 1 is a front elevation of a part of a disk and rim of a demountable rim wheel.

Figure 2 is a transverse section on line 2—2 of Figure 1.

Figure 3 is a transverse section on line 3—3 of Figure 1.

Figure 4 is a section on line 4—4 of Figure 2.

In the drawing 1 indicates an ordinary automobile rim of the quick detachable type and 2 indicates the side ring as part of the rim 1. 3 indicates the disk which forms the web of the wheel, and this inclined flange merges into a marginal flange 5, and these two flanges are in contact with the inside of the rim adjacent to the gutter section of the rim.

The rim is clamped on to the disk by the medium of a clamping ring 6 held by bolts 7, but in place of the clamping ring 6, I may use clips or lugs.

For the driving lug on the rim to prevent the rim slipping around on the disk I provide an oval block 8 secured by rivets 9 to the rim body 1.

At the location of this driving lug 8, I depress the disk flanges 4 and 5 into the cup-like depression 10, see Figure 4, which results in widening this flange slightly right at the summit of the depression 10. The gentle curved shape of this depression 10 in the flanges 4 and 5 of the disk does not weaken the metal and at the same time furnishes all that is needed for a driving lug contact between the rim and the disk.

In place of the rivets 9, I may weld on this oval block, as desired.

What I claim is:—

1. In a device of the class described, a disk forming the web of the wheel and having a marginal flange turned thereon, a demountable rim seated on the said flange, a driving lug secured to the said rim and a cup-like depression in the margin of the flange shaped to embrace the said driving lug on the rim.

2. In a device of the class described, a disk forming the web of the wheel, a tire carrying rim fixed to the margin of the disk in demountable fashion, a curved shaped driving lug secured to the rim and the said disk provided with a marginal cup-like depression adapted to furnish a seat for the said curved shaped driving lug.

Signed at Chicago, in the county of Cook and State of Illinois, this 23rd day of December, 1922.

WILLIAM ERASTUS WILLIAMS.

Witnesses:
B. J. BERNHARD,
H. C. BUECKER.